(12) United States Patent
Ohly (10) Patent No.: US 7,625,031 B2
(45) Date of Patent: Dec. 1, 2009

(54) SELECTIVELY DETACHABLE TAILGATE CABLE ASSEMBLY

(75) Inventor: Benjamin G. Ohly, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 547 days.

(21) Appl. No.: 11/586,857

(22) Filed: Oct. 26, 2006

(65) Prior Publication Data

US 2008/0100084 A1    May 1, 2008

(51) Int. Cl.
B62D 33/03    (2006.01)
(52) U.S. Cl. .......................... 296/50; 296/57.1
(58) Field of Classification Search ........... 296/50, 296/51, 57.1, 59, 146.8, 106; 16/194, 196, 16/DIG. 17; 174/72 A
See application file for complete search history.

(56) References Cited

U.S. PATENT DOCUMENTS

| | | | | | |
|---|---|---|---|---|---|
| 1,294,665 | A | * | 2/1919 | Hubbard | 296/60 |
| 3,180,673 | A | * | 4/1965 | Wanlass | 296/57.1 |
| 4,702,511 | A | * | 10/1987 | Olins | 296/57.1 |
| 5,000,503 | A | * | 3/1991 | Bernatek | 296/39.2 |
| 5,092,647 | A | * | 3/1992 | Ueda et al. | 296/146.9 |
| 5,154,565 | A | | 10/1992 | Bourgeois | |
| 5,449,212 | A | | 9/1995 | Seifert | |
| 5,645,310 | A | * | 7/1997 | McLaughlin | 296/180.5 |
| 6,068,321 | A | | 5/2000 | Ooms | |
| 6,131,991 | A | * | 10/2000 | Sugitani | 296/208 |
| 6,196,609 | B1 | * | 3/2001 | Bowers | 296/57.1 |
| 6,217,097 | B1 | | 4/2001 | Rogers, Jr. et al. | |
| 6,267,429 | B1 | * | 7/2001 | Kuzmich et al. | 296/50 |
| 6,276,743 | B1 | | 8/2001 | Jyawook et al. | |
| 6,357,813 | B1 | | 3/2002 | Vandeberghe et al. | |
| 6,431,630 | B1 | * | 8/2002 | Meinke | 296/50 |
| 6,431,638 | B1 | * | 8/2002 | Mrozowski et al. | 296/146.8 |
| 6,523,307 | B2 | * | 2/2003 | Prete et al. | 49/445 |
| 6,588,151 | B1 | | 7/2003 | Goscicki et al. | |
| 6,607,232 | B2 | * | 8/2003 | Katulka | 296/57.1 |
| 6,773,047 | B2 | | 8/2004 | Gruber | |
| 6,793,264 | B1 | | 9/2004 | Muller et al. | |
| 6,854,781 | B2 | * | 2/2005 | Roach | 296/57.1 |
| 6,857,679 | B2 | * | 2/2005 | Zagaroff | 296/57.1 |
| 6,908,142 | B2 | * | 6/2005 | Gougeon et al. | 296/146.8 |
| 6,951,358 | B1 | * | 10/2005 | Ousley et al. | 296/57.1 |
| 6,991,277 | B1 | * | 1/2006 | Esler | 296/50 |
| 7,040,683 | B1 | * | 5/2006 | Beach | 296/57.1 |

(Continued)

*Primary Examiner*—Glenn Dayoan
*Assistant Examiner*—Gregory Blankenship
(74) *Attorney, Agent, or Firm*—Global IP Counselors, LLP (57) ABSTRACT

An exemplary embodiment of a selectively detachable tailgate cable assembly comprises a tailgate cable having first and second ends and a wiring harness having first and second ends. One of the first and second ends of the tailgate cable is connected to a portion of a vehicle and the other of the first and second ends of the tailgate cable is connected to a portion of a tailgate. At least one of the first and second ends of the tailgate cable may be selectively detached from either the vehicle or the tailgate. One of the first and second ends of the wiring harness is operatively connected to a power source and the other of the first and second ends of the wiring harness is connected to an electrical connection positioned on a portion of the tailgate. At least one of the first and second ends of the wiring harness may be selectively detached from either the vehicle or the tailgate.

26 Claims, 10 Drawing Sheets

U.S. PATENT DOCUMENTS

| | | | |
|---|---|---|---|
| 7,093,349 B2* | 8/2006 | Prete et al. | 29/700 |
| 7,182,380 B2* | 2/2007 | Nagle | 296/26.11 |
| 7,314,241 B2* | 1/2008 | Roach | 296/57.1 |
| 7,423,224 B2* | 9/2008 | Puhl | 174/650 |
| 7,484,784 B2* | 2/2009 | Ohly | 296/57.1 |
| 7,533,920 B2* | 5/2009 | Ohly | 296/53 |
| 2001/0033091 A1 | 10/2001 | Rogers, Jr. et al. | |
| 2004/0032141 A1 | 2/2004 | Moyna | |
| 2004/0108743 A1 | 6/2004 | Gruber | |
| 2004/0245801 A1* | 12/2004 | Gates et al. | 296/146.8 |
| 2007/0046060 A1* | 3/2007 | Werner | 296/51 |
| 2008/0054667 A1* | 3/2008 | Ohly | 296/57.1 |
| 2008/0100084 A1* | 5/2008 | Ohly | 296/50 |
| 2008/0100085 A1* | 5/2008 | Ohly | 296/57.1 |

* cited by examiner

SELECTIVELY DETACHABLE TAILGATE CABLE ASSEMBLY

TECHNICAL FIELD

Described herein is an illustrative selectively detachable tailgate cable assembly for a motor vehicle.

BACKGROUND

Various types of motor vehicles, such as pickup trucks and SUTs (sport utility trucks), are provided with tailgates that provide access to cargo beds. The tailgates for these vehicles are often hinged at the bottom and operatively connected to the rear end of the cargo bed. To access the cargo beds, the tailgates may be opened and closed, either manually or by a power control apparatus. When in the closed position, the tailgate is secured to the vehicle using fork-bolt type latches on lateral ends of the tailgate that operatively engage with striker pins extending from sidewalls of the cargo bed. When in the open position, the tailgate may be partially supported by a tailgate cable assembly, where the tailgate cable assembly includes a first end that is connected to a portion of the vehicle and a second end that is connected to a portion of the tailgate. In instances where it is desirable to selective detach the tailgate from the vehicle body; there is a need for the tailgate cable to be easily removed from either the tailgate or the vehicle body with minimal effort.

The detachability of the tailgate is even more problematic in vehicles where the tailgate may carry components that need to be electrically connected to a power source. For example, in a tailgate that utilizes a power control apparatus to release or engage the latching mechanism, it is necessary that the tailgate be electrically connected a power source, which entails providing suitable wiring that extends from the tailgate into a portion of the vehicle body where the power source is located. However, in instances where it may be desirable to selectively detach a tailgate from the vehicle, the wiring leading from the tailgate to the vehicle body becomes problematic in that it cannot be easily detached. Accordingly, there is a need for a tailgate wiring system for providing power to the tailgate that may be easily detached to permit selective detachment of the tailgate from a vehicle body with minimal effort.

SUMMARY

An exemplary embodiment of a selectively detachable tailgate cable assembly comprises a tailgate cable having first and second ends and a wiring harness having first and second ends. One of the first and second ends of the tailgate cable is connected to a portion of a vehicle and the other of the first and second ends of the tailgate cable is connected to a portion of a tailgate. At least one of the first and second ends of the tailgate cable may be selectively detached from either the vehicle or the tailgate. One of the first and second ends of the wiring harness is operatively connected to a power source and the other of the first and second ends of the wiring harness is connected to an electrical connection positioned on a portion of the tailgate. At least one of the first and second ends of the wiring harness may be selectively detached from either the vehicle or the tailgate.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of a power tailgate assembly of the present invention will now be described in connection with its use on a vehicle.

Figure 1:
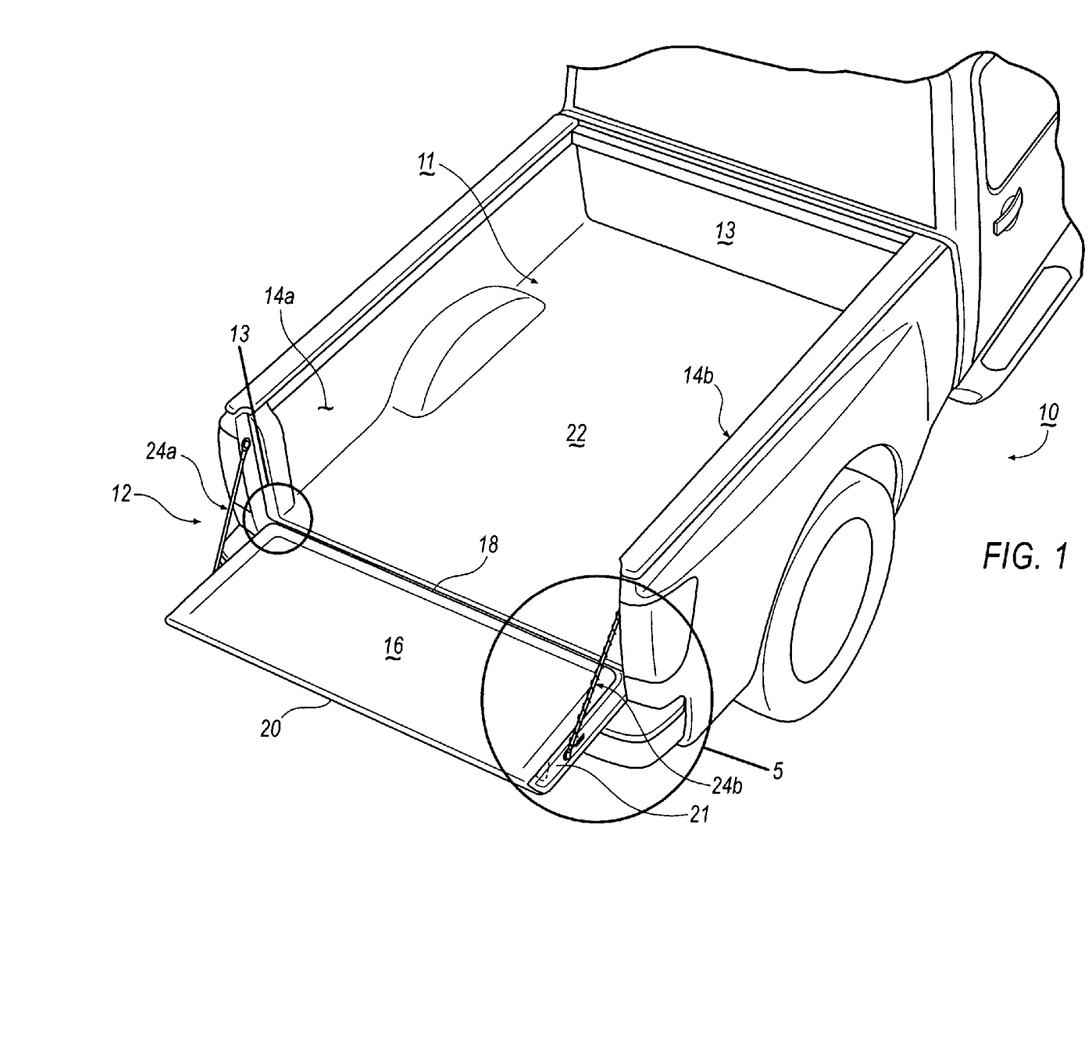
FIG. 1 is a perspective view of the rear end of a vehicle equipped with selectively detachable tailgate cable assemblies and illustrating a tailgate in an open position.
Figure 2:
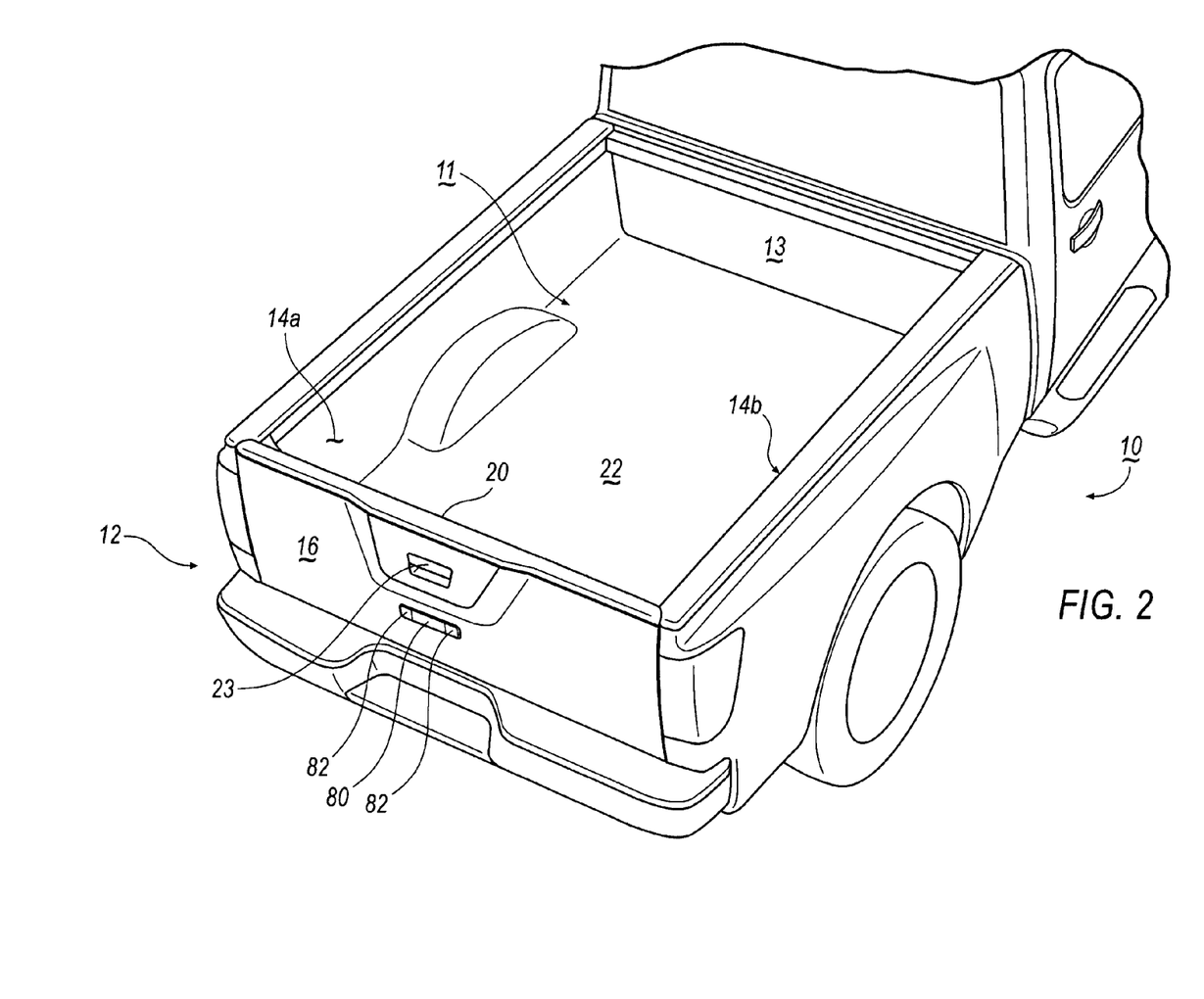
FIG. 2 is a perspective view of the rear end of the vehicle of FIG. 1 with the tailgate in a closed position.
Figure 3:
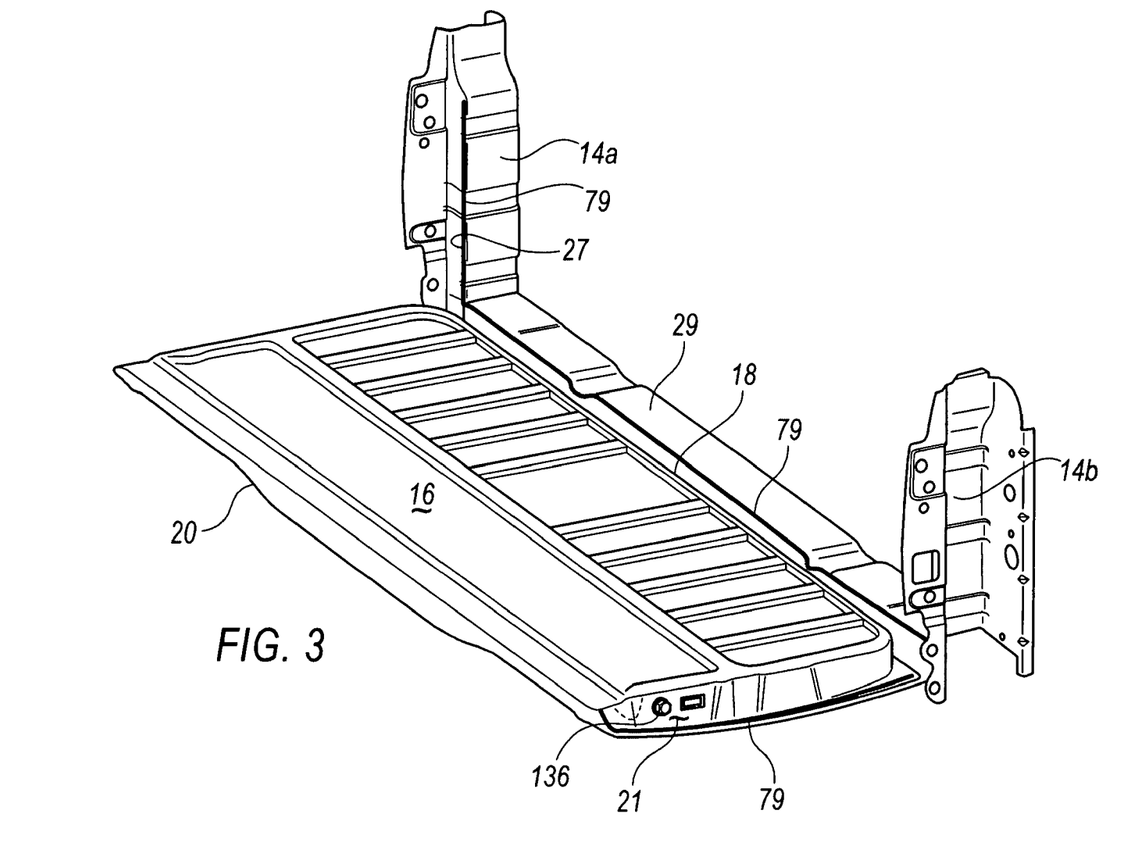
FIG. 3 is a perspective view of the tailgate assembly of FIG. 1 in the open position.

Referring to FIG. 1, there is shown a vehicle 10 having a cargo bed 11. The cargo bed 11 is generally defined by a floor portion 22, a front wall 13, two laterally spaced side walls 14a, 14b and a selectively movable tailgate 16. Tailgate 16 includes a first end 18 and a second end 20. The first end 18 of tailgate 16 is hingedly connected to a portion of a rear end 12 of vehicle 10. Tailgate 16 is movable between a closed position and an open position. When tailgate 16 is in the closed position, tailgate 16 is generally perpendicular to floor portion 22 (as best seen in FIG. 2). A latching mechanism (shown in phantom in FIGS. 1 and 3), such as a fork-bolt type latch, is provided on respective side edges 21 of tailgate 16. Each latching mechanism engages a corresponding latch member (not shown) that is positioned on a portion of side walls 14*a* and 14*b*, such as a striker pin, to secure tailgate 16 in the closed position.

Once tailgate 16 is in the closed position, in one embodiment, the latching mechanism may be actuated to release the latching mechanism from the latch member. In one embodiment, the latching mechanism may be manually released from the latch member by operating a handle 23 (best seen in FIG. 2). In another embodiment, as disclosed in co-pending U.S. patent application Ser. No. 11/513,864, the disclosure of which is incorporated in its entirety by reference, tailgate 16 may be a power tailgate that is operatively connected to a power source. In such an embodiment, the power source may be configured to release the latching mechanism from the latch member in response to a signal from an actuation member. In either embodiment, once released from the closed position, tailgate 16 may be lowered into the open position, whereby tailgate 16 is generally coplanar with the floor portion 22, as shown in FIG. 1.

As may be seen in FIG. 1, tailgate 16 is provided with at least one tailgate cable assembly 24*a*, 24*b* that is connected to both vehicle 10 and tailgate 16. When tailgate 16 is in the open position, tailgate cable assemblies 24*a*, 24*b* serve to partially support tailgate 16 in the open position and/or serve as a fail/safe against potential failure of the hinge mechanisms that connect tailgate 16 to vehicle 10. Tailgate cable assemblies 24*a*, 24*b* may have a predetermined length so as to limit how far tailgate 16 may open. It is desired that at least one end of each tailgate cable assembly 24*a*, 24*b* may be selectively detached from either tailgate 16 or vehicle 10 such that tailgate 16 may be selectively removable from vehicle 10. Details of both tailgate cable assemblies 24*a* and 24*b* (and related embodiments thereto) will be described further below.

Figure 13:
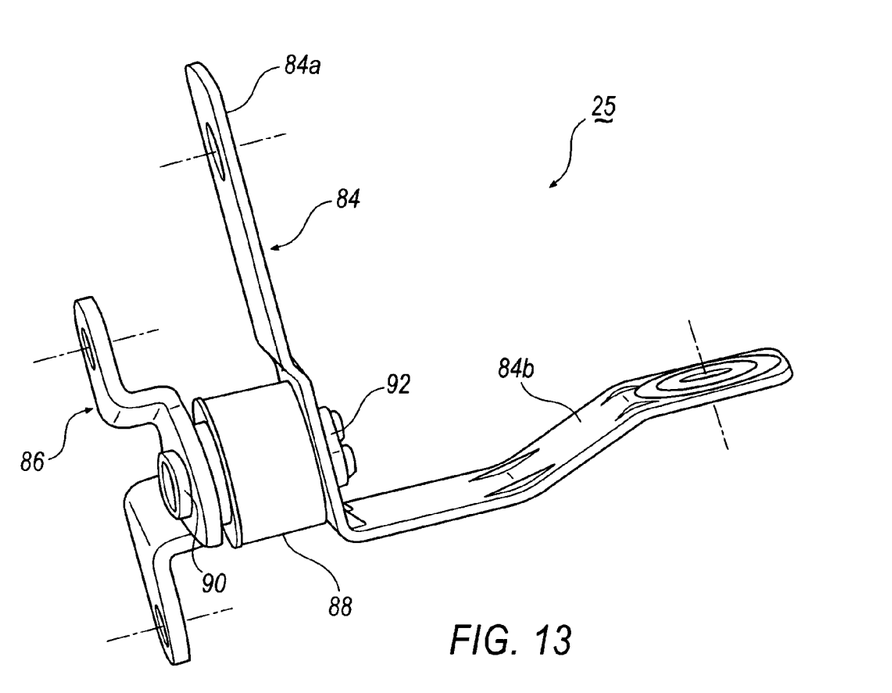
FIG. 13 is a perspective view of a manual selectively detachable hinge mechanism.

As mentioned above, tailgate 16 is hingedly connected to a vehicle by a pair of hinge mechanisms. In one embodiment, tailgate 16 is provided with a pair of selectively detachable hinge mechanisms 25, as best seen in FIG. 13 (hereinafter "first hinge mechanism 25"). First hinge mechanisms 25 may be used with tailgates 16 that are manually operated and moved between the open and closed positions. Portions of first hinge mechanism 25 may be selectively detached to permit quick and easy removal of tailgate 16 from vehicle. First hinge mechanism 25 will be described in further detail below.

Figure 4:
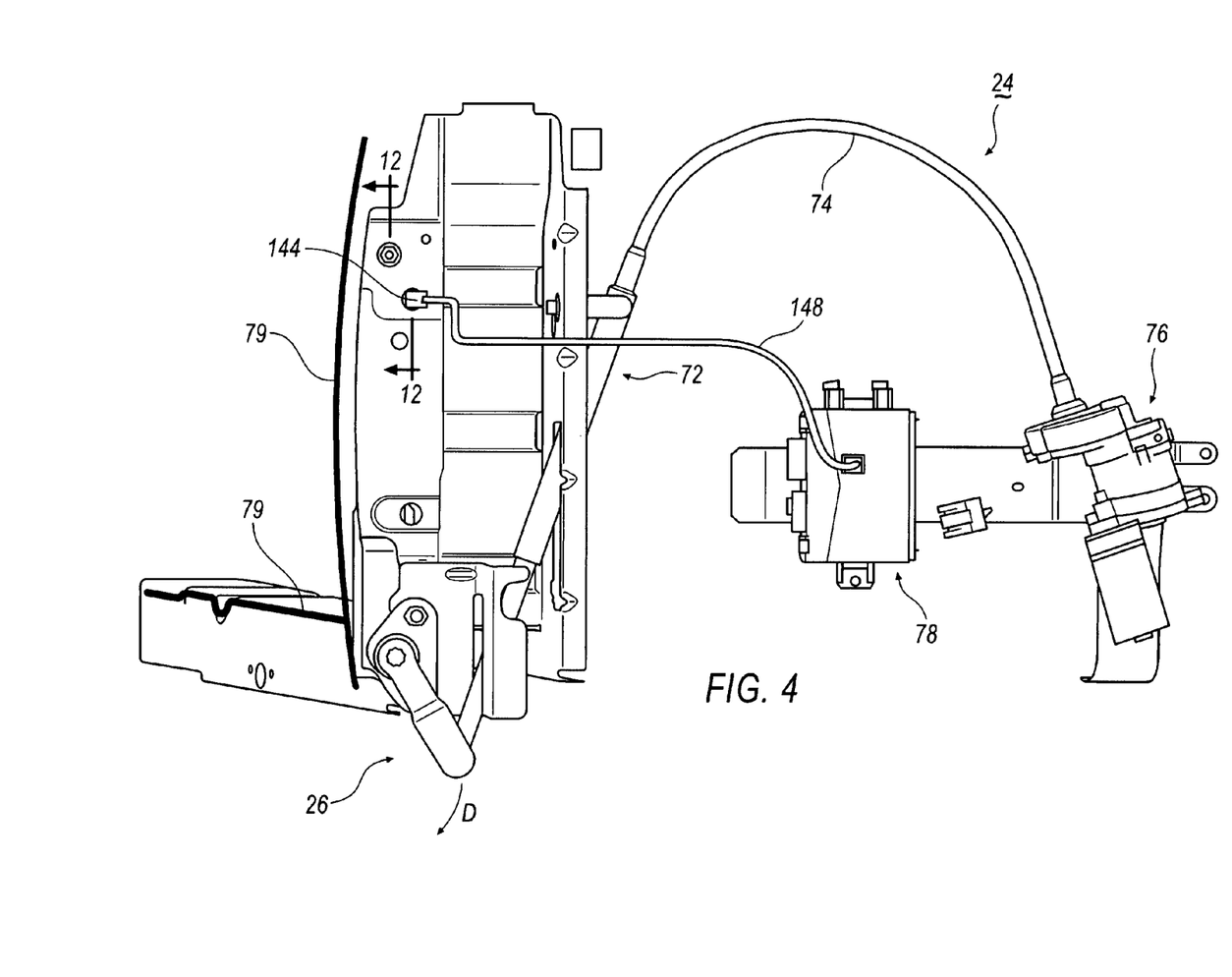
FIG. 4 is an enlarged side view of a portion of the vehicle, illustrating a hinge mechanism for a tailgate assembly that is operatively connected to a power assembly.

Alternatively, tailgate 16 may be provided with a first hinge mechanism 25 and a second selectively detachable hinge mechanism 26 (hereinafter "second hinge mechanism") that is operatively connected to a power assembly 24 (as best seen in FIG. 4). The second hinge mechanism 26, which is more fully disclosed in co-pending U.S. patent application Ser. No. 11/513,864, is connected to power assembly 24 and includes a tailgate bracket 28, that has one portion secured to side edge 21 of tailgate 16, and a second portion that is secured to first end 18 of tailgate 16. Power assembly 24 serves to release the latching mechanism, as well as open and close tailgate 16. Like first hinge mechanism 25, a portion of second hinge mechanism 26 may be selectively detached from another portion of second hinge mechanism 26 to permit tailgate 16 to be selectively removed from vehicle 10.

In one embodiment, power assembly 24 includes a screw assembly 72 that is connected to a wire cable 74. A motor assembly 76 operates the screw assembly 72. A controller 78 controls motor assembly 76. While power assembly 24 may control the operation of tailgate 16, power assembly 24 may also serve a number of alternative functions. For example, in addition to providing power to tailgate 16 to selectively engage and disengage the latching mechanism (not shown) that secures tailgate 16 to a portion of vehicle 10, power assembly 24 may also provide power to one or more sensors, such as pinch strips 79 to modify operation of tailgate 16 in the event of an obstruction in the path of tailgate 16. For example, sensors may be used to detect whether or not an obstruction is present in the travel path of tailgate 16 as it moves between the open and closed positions that may impede proper closing of tailgate 16. In such an embodiment, the sensors are in electrical communication with controller 78. Based on signals received from the sensors, controller 78 may stop motor assembly 76 from continuing with moving tailgate 16 into the closed position or instruct motor assembly 76 to return tailgate 16 to the open position.

As suggested above, in one embodiment, pinch strips 79 serve as the sensors that are in electrical communication with controller 78. As may be seen, for example, in FIGS. 3 and 4, pinch strips 79 are generally disposed along side edge 21, as well as contact surfaces 27 and 29 of tailgate 16, walls 14*a*, 14*b*, and cargo bed 22, respectively. When controller 78 activates motor assembly 76 to move tailgate 16 from an open position to a closed position, pinch strips 79 are utilized to sense if an obstruction is present. If an obstruction is present, controller 78 will stop motor assembly 76 from continuing moving tailgate 16 into the closed position. Controller 78 may also be programmed to automatically return tailgate 16 to the open position when an obstruction is present. Thus, motor assembly 76 is protected from abusive loading and damage due to the presence of an obstruction, and a user is also protected from inadvertent closure of tailgate 16 on a body part.

Power assembly 24 may further provide power to a rear brake light 80 and/or reverse lights 82 (as best seen in FIG. 2) mounted on tailgate 16 through a wiring harness (to be explained in further detail below).

Operation of power assembly 24 with respect to second hinge mechanism 26 will now be described. In operation, a switch (not shown), which may be located on wall 14*a* of vehicle 10, an interior of vehicle 10, or on a key fob (not shown); sends a signal to controller 78 to move tailgate 16. If tailgate 16 is in the open position, controller 78 causes motor assembly 76 to move components of wire cable 74 in a first direction so as to actuate screw assembly 72, which is connected to a portion of second hinge mechanism 26. Screw assembly 72 then drives a portion of second hinge mechanism 26 downward (indicated by arrow D in FIG. 4), thereby activating second hinge mechanism 26 so as to raise tailgate 16 into the closed position (see FIG. 2), whereby the latching mechanism will be engaged with the mating latching member.

To lower tailgate 16 into the open position (see FIG. 1 and 3, e.g.), the switch is activated and power assembly 24 releases the latch mechanism. Motor assembly 76 moves components of wire cable 74 in a second direction, such that a portion of second hinge mechanism 26 is rotated upwardly in a direction opposite of arrow D. By this action, second hinge mechanism 26 is activated to permit tailgate 16 to rotate so as to lower tailgate 16 into the open position.

In one embodiment, tailgate 16 may be moved between the open and closed position via a switch, as described above. In another embodiment, the latching mechanism is manually released by handle 23 and tailgate 16 is rotated to a predetermined angle upon which screw assembly 72 and motor assembly 76 will permit tailgate 16 to lower into the open position.

Controller 78 may further be programmed to only operate tailgate assembly 26 under certain conditions. For example, controller 78 may be programmed to prohibit release of tailgate 16 from the closed position when vehicle 10 is in a driving mode. Controller 78 may also be programmed to prohibit release of tailgate 16 if tailgate 16 is locked. Further, controller 78 may also be programmed to provide an indicator (such as a light on the dash panel or an audible sound) to a driver upon start of vehicle 10 if tailgate 16 is in the open position.

First hinge mechanism 25 is illustrated in greater detailed in FIG. 13. In the embodiment shown, first hinge mechanism 25 is positioned in encircled area 13 of FIG. 1 and is not attached to a power assembly, like hinge mechanism 26. Hinge mechanism 25 includes a tailgate bracket 84, a vehicle bracket 86 and a collar 88 that contains a roller bearing (not shown). Tailgate bracket 84 is fixedly secured to tailgate 16 with one portion 84a being secured to a side edge 21 of tailgate 16 and a second portion 84b being secured to first end 18 of tailgate 16.

A driveshaft 90 is fixedly connected to vehicle bracket 86, and extends through collar 88 and through a slotted opening (not shown) formed on collar 88. The slotted opening has a slot area that is only accessible when tailgate 16 is rotated to a predetermined angle. A connection mechanism 92 may be secured to an end of collar 88 to secure collar 88 to tailgate bracket 84. Vehicle bracket 86 is fixedly connected to a portion of vehicle 10 such as wall 14a.

As mentioned above, tailgate 16 may be provided with at least one tailgate cable 24a, 24b. Each tailgate cable assembly 24a, 24b will now be described.

Figure 6A:
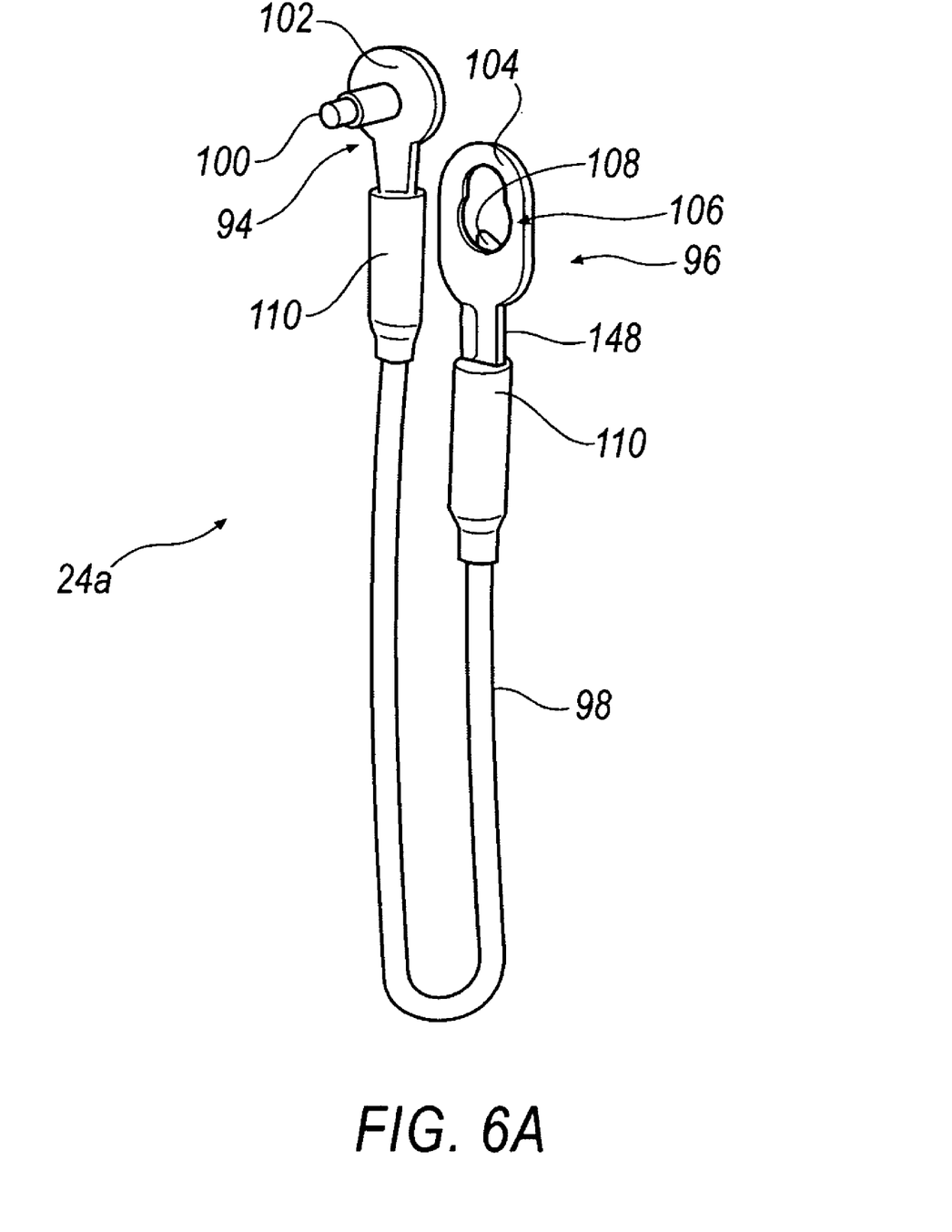
FIG. 6A is a perspective view of a first embodiment of a selectively detachable tailgate cable assembly.

The first embodiment of a tailgate cable assembly 24a (hereinafter "first tailgate cable assembly 24a") is shown in FIG. 6A. First tailgate cable assembly 24a comprises a first end 94 and a second end 96. First end 94 may be operatively connected to a portion of vehicle 10 and second end 96 may be operatively connected to a portion of tailgate 16, for example, as shown in FIG. 1. A tailgate cable 98 connects first and second ends 94, 96 together. Tailgate cable 98 may be constructed of stainless steel, or other suitable material. In one embodiment, tailgate cable 98 is enveloped by an outer sleeve (not shown) constructed of a non-abrasive material, such as rubber, to prevent potential damage to tailgate cable 98, as well as to protect the surface finish of vehicle 10 and tailgate 16 from potential damage caused by tailgate cable 98.

First end 94 of first tailgate cable assembly 24a includes an engagement fitting 100 mounted to a flange member 102 that is connected to tailgate cable 98. Engagement fitting 100 is received within a mating opening (not shown) formed in a side wall 14a of vehicle 10. In one embodiment, first end 94 may be selectively detached from vehicle 10 by grasping an edge of flange 102 and pulling engagement fitting out of engagement with the mating opening. In another embodiment, engagement fitting 100 is a threaded fitting that may be selectively detached from the mating opening by rotating engagement fitting 100 in a predetermined direction.

Second end 96 of first tailgate cable assembly 24a includes a slotted engagement flange 104. Engagement flange 104 includes a slot 106 of varying diameters. To engage second end 96 with tailgate 16, a larger diameter portion of slot 106 receives a projection (not shown) formed on a side edge of tailgate 16. Engagement flange 104 is moved so as to slide the projection within slot 106 to the smaller diameter portion. The small diameter portion is sized so as to retain the projection within slot 106 in a friction fit. A retaining member 108 may further be provided and secured to a portion of engagement flange 104 to serve as a deformable spring member to retain the projection within slot 106. Second end 96 may be selectively detached from tailgate 16 to permit tailgate 16 to be selectively removed from vehicle 10, simply by releasing retaining member 108 from the projection and sliding the engagement flange 104 so as to move the projection back to the lager diameter portion of slot 106. Once in this position, engagement flange 104 may be moved out of engagement with the projection.

First tailgate cable assembly 24a may further be provided with boot covers 110. Boot covers 110 are constructed of a non-abrasive material, such as rubber, and are attached to ends of tailgate cable 98. A portion of flange member 102 and engagement flange 104 are each retained within boot covers 110. Boot covers 110 protect the connection of flange member 102 and engagement flange 104 to tailgate cable 98. In addition, boot covers 110 also serve to minimize or prevent undesirable damage to the outer decorative surface of vehicle 10 and tailgate 16.

Figure 5:
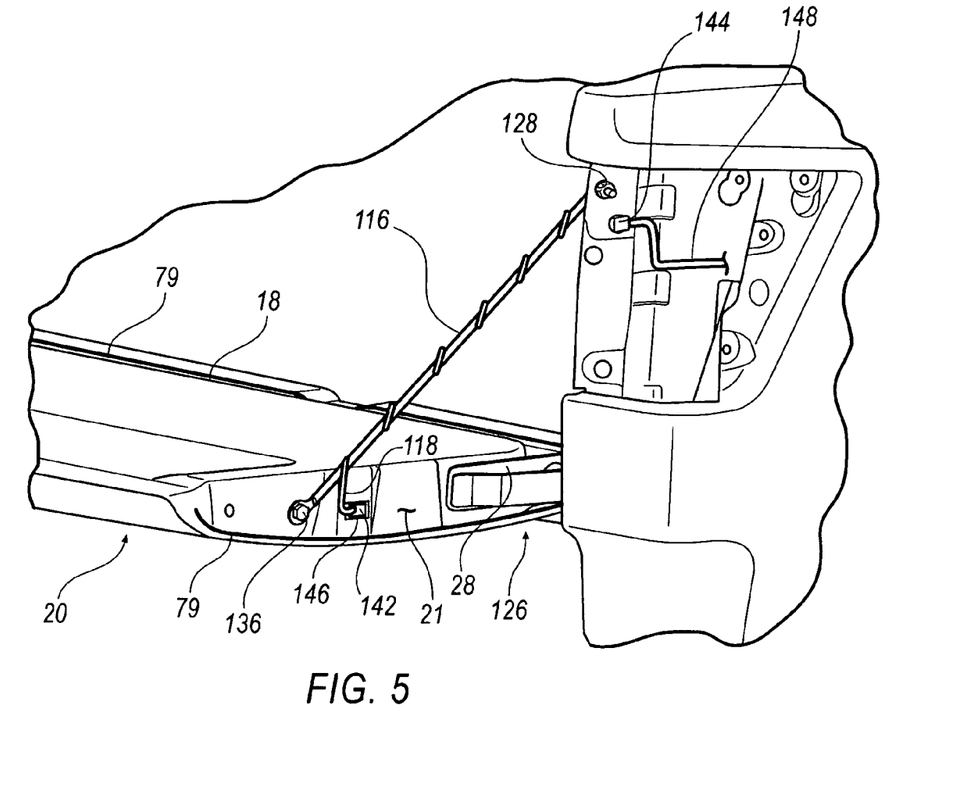
FIG. 5 is a perspective view of one embodiment of a selectively detachable tailgate cable assembly engaged to one side of the tailgate taken from encircled area 5 of FIG. 1.
Figure 6B:
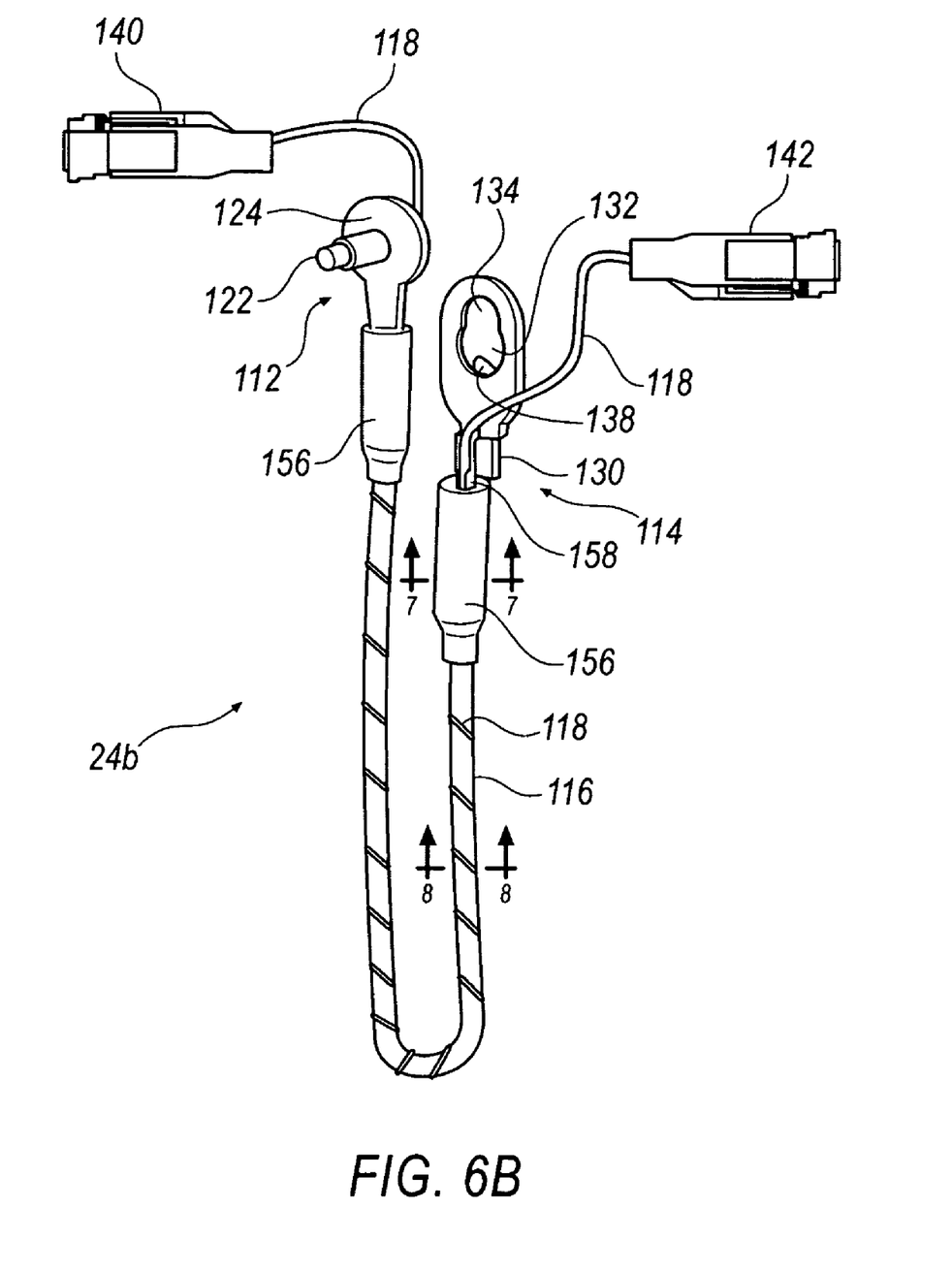
FIG. 6B is a perspective view of a second embodiment of a selectively detachable tailgate cable assembly that is illustrated in FIG. 5.

Second tailgate cable assembly 24b is illustrated in FIGS. 5, and 6B. Similar to first tailgate cable assembly 24a, second tailgate cable assembly 24b comprises a first end 112 and a second end 114. First end 112 may be operatively connected to a portion of vehicle 10 and second end 114 may be operatively connected to a portion of tailgate 16, as shown in FIGS. 1 and 5, for example. Second tailgate cable assembly 24b further comprises a tailgate cable 116 that connects first and second ends 112, 114 together, and a wiring harness 118. Tailgate cable 116 may be constructed of stainless steel, although it is understood that other suitable materials may be employed without departing from the invention. In one embodiment, tailgate cable 116 is enveloped by an outer sleeve 120 (best seen in FIGS. 7 and 8) to prevent potential damage to tailgate cable 116, as well as preventing potential damage to the surface finish of vehicle 10 and tailgate 16 that may be caused by tailgate cable 116 scratching either vehicle 10 or tailgate 16.

Similar to first tailgate cable assembly 24a, first end 112 of second tailgate cable assembly 24b includes an engagement fitting 122 mounted to a flange member 124. Flange member 124 is connected to a portion of tailgate cable 116. Engagement fitting 122 is received within a mating opening 126 (best seen in FIG. 12) formed in a side wall 14b of vehicle 10. In one embodiment, engagement fitting 122 may be selectively detached from mating opening 126.

Figure 12:
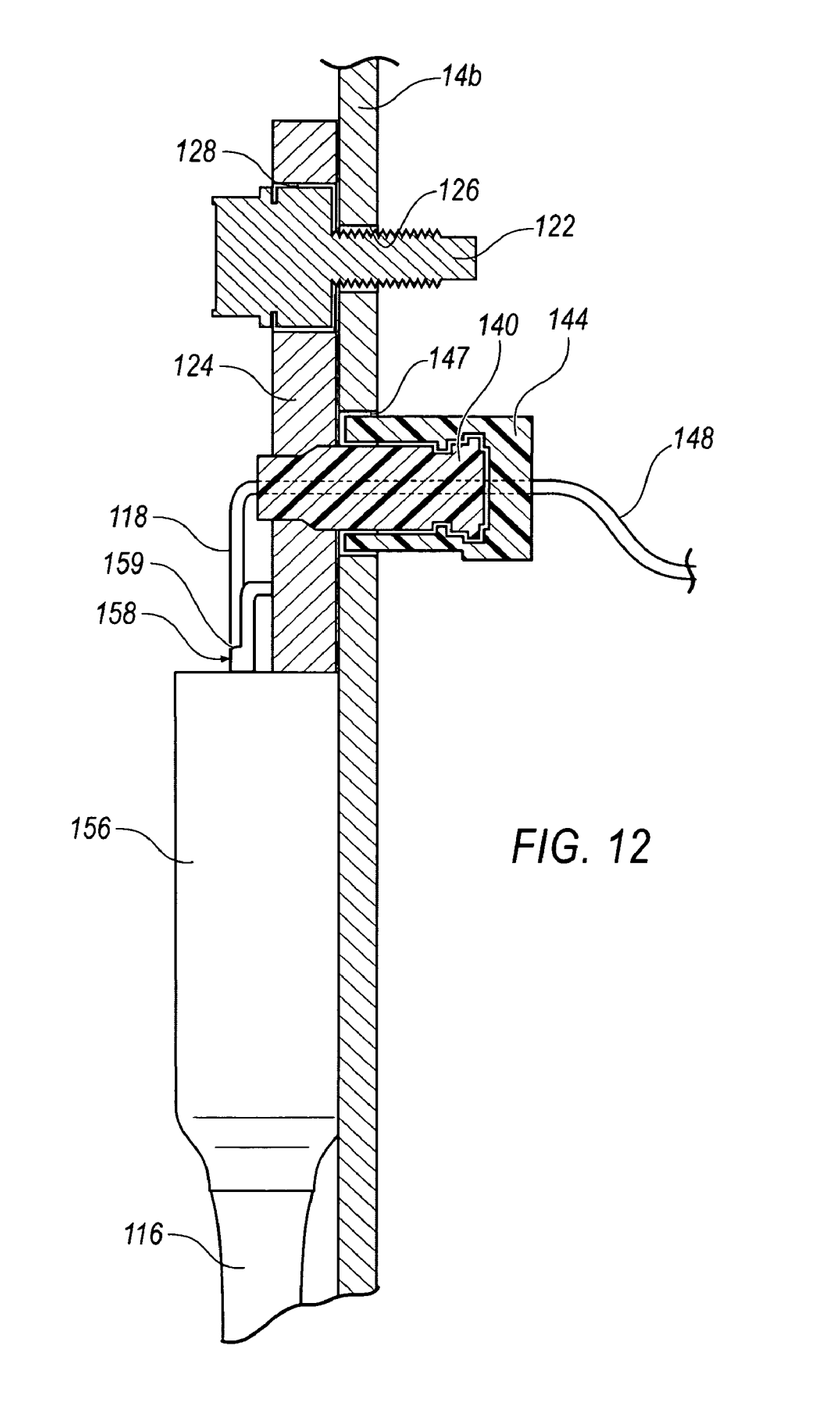
FIG. 12 is a cross-sectional view of a first end of the second embodiment of the selectively detachable tailgate cable assembly connected to a vehicle taken along lines 12-12 of FIG. 4.

While many suitable engagement fittings are contemplated, in one particular embodiment, engagement fitting 122 and mating opening 126 are both threaded to facilitate a mating engagement between fitting 122 and opening 126. Engagement fitting 122 may be a bolt that is received in an opening 128 that formed through flange member 124. Alternatively, engagement fitting 122 may be integrally formed with flange member 124.

Second end 114 of second tailgate cable assembly 24b comprises a slotted engagement flange 130 that is connected to a portion of tailgate cable 116. Slotted engagement flange 130 includes a slot having a first diameter portion 132 and a second diameter portion 134, wherein first diameter portion 132 is larger than second diameter portion 134. Second end 114 may be engaged to a portion of tailgate 16 in a manner similar as that described with respect to first tailgate cable assembly 24a. More specifically, first diameter portion 132 of slotted engagement flange 130 receives a projection 136 formed on side edge 21 of tailgate 16. Large diameter portion 132 is somewhat larger than an outer periphery of projection 136 to permit projection 136 to easily fit within first diameter portion 132. Second end 114 is then moved so as to slide projection 136 to second diameter portion 134. Second diameter portion 134 is sized such that an outer periphery of projection 136 is frictionally retained within second diameter portion 134. A spring-like retaining member 138 may also be provided to assist in retaining projection 136 within second diameter portion 134.

Like first end 112, it is desirable that second end 114 may be selectively detached from tailgate 16 to permit tailgate 16 to be selectively removed from vehicle 10. To detach second end 114, retaining member 138 is released from contact with projection 136 and second end 114 is slid along projection 136 such that projection 136 slides out of contact with second diameter portion 134 and moves to first diameter portion 132. Once projection 136 is positioned within first diameter portion 132, slotted engagement flange 130 may be lifted out of engagement with projection 136.

As may be seen in FIGS. 6B and 7-11, second tailgate cable assembly 24b further includes wiring harness 118. Wiring harness 118 serves to provide an electrical connection between controller 78 and tailgate 16 to power various components carried by tailgate 16. Such components include, but are not limited to, one or more brake lights 80, reverse lights 82, pinch strips 79, and/or a latch mechanism.

Wiring harness 118 includes a first connection end 140 and a second connection end 142. First connection end 140 is received within a mating electrical connector 144 (best seen in FIG. 12). In one embodiment, mating electrical connector 144 is positioned within an opening 147 in side wall 14b and first connection end 140 is detachably received within mating electrical connector 144, such that second connection end 140 may be selectively removed from mating electrical connection 144 to assist in removal of tailgate 16 from vehicle 10. One or more additional wiring harnesses 148 (best seen in FIG. 4), are positioned within the interior portion of vehicle 10 and are in electrical communication with controller 78.

Alternatively, a portion of wiring harness 118 may extend through an opening in side wall 14b such that first connection end 140 is positioned on an interior portion of vehicle 10. In this embodiment, first connection end 140 is connected to a mating electrical connector of a second wiring harness 148 that is positioned within an interior portion of vehicle 10. In this embodiment, first connection end 140 would not be selectively detachable from vehicle 10, unless a portion of a body panel of vehicle 10 was first removed.

Second connection end 142 may be detachably received within a mating electrical connector 146 that is positioned within a portion of side wall 21 of tailgate 16 (as best seen in FIG. 5). Electrical connector 146 is connected to another wiring harness positioned within tailgate 16 (not shown) that is in electrical communication with the various components within tailgate 16 requiring power.

While both first and second connection ends 140 and 142 are illustrated as male connectors that are received within mating female connectors 144 and 146, it is understood that wiring harness 118 may be provided with female connectors that receive a male connector, or that one of first and second connection ends 140 and 142 may be a male connector and the other a female connector without departing from the invention.

As seen in FIG. 6B, in one embodiment, wiring harness 118 extends along the length of tailgate cable 116. For those embodiments where outer sleeve 120 is provided, a portion of wiring harness 118 may be positioned within outer sleeve 120 with first and second connection ends 140 and 142 extending outwardly therefrom. By positioning wiring harness 118 within outer sleeve 120, wiring harness 118 is protected from potential damage caused by weather. Outer sleeve 120 may also protect wiring harness 118 from damage when cargo bed 22 is being loaded and/or unloaded, as well as preventing first and second connection ends 140, 142 of wiring harness 118 from becoming accidentally dislodged from their respective mating connectors 144, 146.

Figure 8:
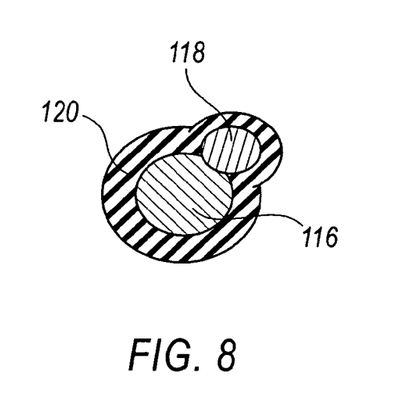
FIG. 8 is a cross-section view of the second embodiment of the selectively detachable tailgate cable assembly taken along lines 8-8 of FIG. 6B.
Figure 9:
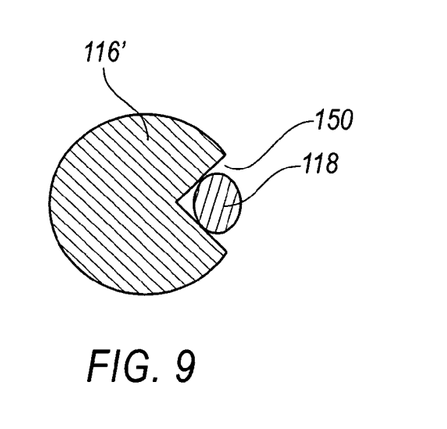
FIG. 9 is a cross-sectional view of an alternative embodiment of a tailgate cable for use in the second embodiment of the selectively detachable tailgate cable assembly.
Figure 10:
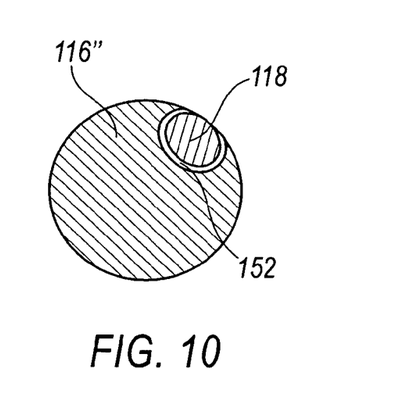
FIG. 10 is a cross-sectional view of another alternative embodiment of a tailgate cable for use in the second embodiment of the selectively detachable tailgate cable assembly.
Figure 11:
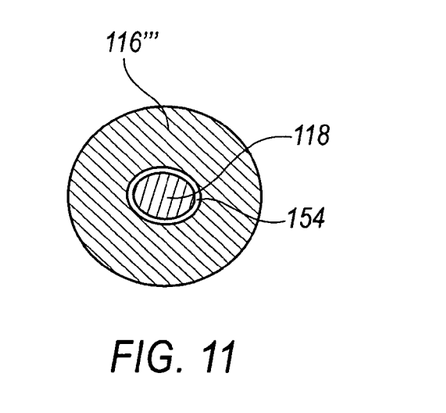
FIG. 11 is a cross-sectional view of yet another alternative embodiment of a tailgate cable for use in the second embodiment of the selectively detachable tailgate cable assembly.

In one embodiment, as best seen in FIGS. 6B and 8, wiring harness 118 is wrapped around an outside surface of tailgate cable 116 in a spiral pattern along the length of tailgate cable 116. In one alternative embodiment, referring to FIG. 9, tailgate cable 116' may be provided with a groove or notch 150 that extends inwardly from an outer surface of tailgate cable 116' that is sized so as to receive at least a portion of wiring harness 118. In another alternative embodiment, referring to FIG. 10, a spiral shaped groove 152 is formed along the length of tailgate cable 116" with groove 152 being shaped and sized to receive at least a portion of wiring harness 118 therein. In yet another embodiment, referring to FIG. 11, tailgate cable 116''' is provided with a channel 154 extending therethrough, wherein wiring harness 118 is positioned in channel 154. While FIG. 11 shows channel 154 to be centrally located within tailgate cable 116''', it is understood channel 154 may be positioned in other locations without departing from the invention.

Similar to first tailgate cable assembly 24a, second tailgate cable assembly 24b may also include boot covers 156. Boot covers 156 are constructed of a non-abrasive material, such as, e.g., rubber, and are attached to ends of tailgate cable 116. If outer sleeve 120 is provided, boot covers 156 are attached to ends of outer sleeve 120. Boot covers 156 protect the connection of flange member 124 and slotted engagement flange 130 to tailgate cable 116. In addition, boot covers 156 also serve to minimize or prevent undesirable damage to the outer decorative surface of vehicle 10 and tailgate 16.

Figure 7:
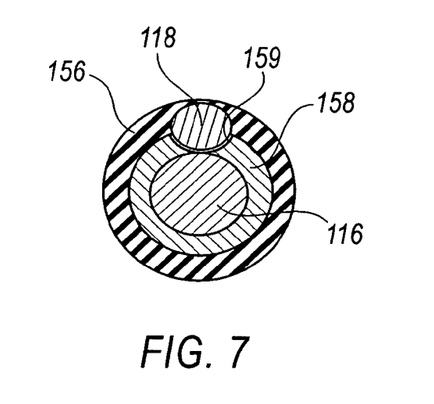
FIG. 7 is a cross-section view of the second embodiment of the selectively detachable tailgate cable assembly taken along lines 7-7 of FIG. 6B.

In one embodiment, boot covers 156 may further be provided with a crimped end fitting 158 (best seen in FIGS. 6B, 7, and 12). A portion of end fitting 158 extends distally of each boot cover 156 and serves to retain a portion of wiring harness 118. As may be seen in FIGS. 6B and 12, end fitting 158 may include a generally curved portion 159 that defines a channel that retains a portion of wiring harness 118.

To selectively disconnect tailgate 16 from vehicle 10, the tailgate cable assemblies 24a and 24b must be detached. Referring first to tailgate cable assembly 24a, either the first or second end (94, 96) is selectively detached from vehicle 10 or tailgate 16, respectively. If, when tailgate 16 is detached, it is desired for tailgate cable assembly 24a to remain with vehicle 10, then second end 96 is selectively detached from tailgate 16 by sliding engagement flange 104 along the projection, as described above. If however, it is desired that tailgate cable assembly 24a is to remain with tailgate 16 when tailgate 16 is detached from vehicle 10, then first end 94 is disengaged from vehicle 10 such that engagement fitting 100 is removed from the opening formed in a portion of the vehicle as described above. Alternatively, tailgate cable assembly 24a may be completely removed from both vehicle 10 and tailgate 16, is so desired.

To detach tailgate cable assembly 24b, one of either of the first or second ends (112, 114) is selectively detached from vehicle 10 or tailgate 16. In addition, a corresponding first and second connector 140 and 142 must also be selectively detached from their mating connectors 144, 146. In other words, if first end 112 is selectively detached from vehicle 10, then first connector 140 must also be selectively detached from its mating connector 144 to accomplish detachment of tailgate cable assembly 24b. Similarly, if second end 114 is selectively detached from tailgate 16, then second connector 142 must also be selectively detached from its mating connector 146 to accomplish detachment of tailgate cable assembly 24b. Thus, if, when tailgate 16 is detached, it is desired for tailgate cable assembly 24b to remain with vehicle 10, then second end 114 is selectively detached from tailgate 16 by sliding engagement flange 130 along projection 136, as described above. If however, it is desired that tailgate cable assembly 24b is to remain with tailgate 16 when tailgate 16 is detached from vehicle 10, then first end 112 is disengaged from vehicle 10 such that engagement fitting 122 is removed from opening 126 formed in a portion of vehicle 10 as described above. Alternatively, tailgate cable assembly 24b may be completely removed from both vehicle 10 and tailgate 16, is so desired.

The process for removing tailgate 16 from vehicle 10 also includes selectively disconnecting hinge mechanism 25. To disconnect hinge mechanism 25, tailgate 16 first must be opened to a predetermined angle. In one embodiment, the predetermined angle is about 45°. Once tailgate 16 has been rotated to the predetermined angle, tailgate 16 is pulled so as to move driveshaft 90 out of engagement with the slot formed on tailgate bracket 84, thereby releasing driveshaft 90 from tailgate bracket 84, and disconnecting hinge mechanism 25. Once hinge mechanism 25 is disconnected the tailgate may simply be pulled laterally away from side wall 14b such that a portion of the remaining hinge mechanism (25 or 26) detaches from another portion of the remaining hinge mechanism.

The preceding description has been presented only to illustrate and describe exemplary embodiments of the methods and systems of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A selectively detachable tailgate cable assembly for attaching a tailgate to a vehicle, comprising:
    a tailgate cable comprising a first end and a second end, with one of the first and second ends of the tailgate cable being selectively connected to a portion of the vehicle and an other of the first and second ends of the tailgate cable being selectively connected to a portion of the tailgate; and
    a wiring harness having a first end and a second end, with one of the first and second ends of the wiring harness being operatively connected to a power source and an other of the first and second ends of the wiring harness being connected to an electrical connection positioned on a portion of the tailgate,
    such that at least one of the first and second ends of the wiring harness may be selectively detached from either the power source or the electrical connection, and
    the tailgate cable and the wiring harness form a unitary assembly which attaches and detaches together as a unit with respect to the vehicle and the tailgate.

2. The selectively detachable tailgate cable assembly of claim 1, further comprising
    a first wiring harness connector connected to the first end of the wiring harness and a second wiring harness connector connected to the second end of the wiring harness, wherein
    the first and second wiring harness connectors electrically connect to mating electrical connectors.

3. The selective detachable tailgate cable assembly of claim 2, wherein
    the first wiring harness connector mates with a mating connector that is at least partially disposed within a side wall of vehicle.

4. The selective detachable tailgate cable assembly of claim 3, wherein
    the second wiring harness connector mates with a mating connector that is at least partially disposed within a side edge of the tailgate.

5. The selective detachable tailgate cable assembly of claim 4, wherein
    the first and second wiring harness connectors are male connectors and the mating connectors are female connectors.

6. The selectively detachable tailgate cable assembly of claim 1, wherein
    the first end of tailgate cable assembly further comprises a first mounting element secured thereto, wherein
    the first mounting element is adapted to be selectively and detachably secured to a portion of the vehicle.

7. The selectively detachable tailgate cable assembly of claim 6, wherein
    the first mounting element is a projection that is detachably received within an opening formed in the portion of the vehicle.

8. The selectively detachable tailgate cable assembly of claim 1, wherein
    the second end of the tailgate cable assembly further comprises a second mounting element secured thereto, wherein
    the second mounting element is adapted to be selectively and detachably secured to a portion of the tailgate.

9. The selectively detachable tailgate cable assembly of claim 8, wherein
    the second mounting element is a slotted engagement flange having a slotted opening there through that detachably receives a projection that is secured to the portion of the tailgate.

10. The selectively detachable tailgate cable assembly of claim 9, further comprising
    a retaining element secured to the engagement flange, wherein
    a portion of the retaining element assists in securing the projection within the slotted opening.

11. The selectively detachable tailgate cable assembly of claim 1, wherein
    the tailgate cable comprises a groove formed in an outer periphery thereof and wherein
    a portion of the wiring harness is disposed therein.

12. The selectively detachable tailgate cable assembly of claim 11, wherein
    the groove extends along the length of the tailgate cable.

13. The selectively detachable tailgate cable assembly of claim 12, wherein
    the groove extends in a spiral pattern along the length of the tailgate cable.

14. The selectively detachable tailgate cable assembly of claim 1, wherein
    the tailgate cable further comprises a channel extending therethrough and wherein
    a portion of the wiring harness is disposed within the channel.

15. The selectively detachable tailgate cable assembly of claim 1, wherein
the wiring harness is wrapped around the outside of the tailgate cable in a spiral pattern.

16. The selectively detachable tailgate cable assembly of claim 1, wherein
the tailgate cable and the wiring harness are coupled together along an entire length of the tailgate cable.

17. The selectively detachable tailgate cable assembly of claim 1, wherein
each of the first and second ends of the tailgate cable has a boot cover which at least partially covers the first and second ends of the wiring harness.

18. A selectively detachable tailgate cable assembly for attaching a tailgate to a vehicle, comprising:
a tailgate cable comprising a first end and a second end, with one of the first and second ends of the tailgate cable being selectively connected to a portion of the vehicle and an other of the first and second ends of the tailgate cable being selectively connected to a portion of the tailgate; and
a wiring harness having a first end and a second end, with one of the first and second ends of the wiring harness being operatively connected to a power source and an other of the first and second ends of the wiring harness being connected to an electrical connection positioned on a portion of the tailgate,
such that at least one of the first and second ends of the wiring harness may be selectively detached from either the power source or the electrical connection, and
at least a portion of the wiring harness is wrapped around the tailgate cable to form a unitary assembly.

19. The A selectively detachable tailgate cable assembly for attaching a tailgate to a vehicle, comprising:
a tailgate cable comprising a first end and a second end, with one of the first and second ends of the tailgate cable being selectively connected to a portion of the vehicle and an other of the first and second ends of the tailgate cable being selectively connected to a portion of the tailgate;
a wiring harness having a first end and a second end, with one of the first and second ends of the wiring harness being operatively connected to a power source and an other of the first and second ends of the wiring harness being connected to an electrical connection positioned on a portion of the tailgate,
such that at least one of the first and second ends of the wiring harness may be selectively detached from either the power source or the electrical connection; and
an outer sleeve, the tailgate cable and wiring harness being both at least partially enveloped within the outer sleeve.

20. The selectively detachable tailgate cable assembly of claim 19, wherein
the wiring harness is wrapped around the outside of the tailgate cable in a spiral pattern.

21. The selectively detachable tailgate cable assembly of claim 19, further comprising
first and second boot covers, wherein
the boot covers are secured to respective ends of the outer sleeve.

22. The selectively detachable tailgate cable assembly of claim 21, further comprising
a wiring harness fitting positioned within at least one of the boot covers, wherein
the fitting includes a channel that retains a portion of the wiring harness.

23. A tailgate assembly for a vehicle, comprising:
a tailgate movable between an open position and a closed position;
a hinge mechanism connecting the tailgate to a portion of the vehicle, such that at least one portion of the hinge mechanism may be selectively detached from another portion of the hinge mechanism to permit the tailgate to be removed from the vehicle;
a power assembly that is operatively connected to the tailgate, the power assembly supplying power to the tailgate; and
a selectively detachable tailgate cable assembly comprising a tailgate cable and a wiring harness,
the tailgate cable having a first end and a second end, the first end of the tailgate cable being connected to a portion of the vehicle and the second end of the tailgate cable being connected to a portion of the tailgate,
the wiring harness having a first end and a second end the first end of the wiring harness being operatively connected to the power assembly and the second end of the wiring harness being connected to an electrical connector in the tailgate, power being transmitted to the tailgate when the wiring harness is connected between the power assembly and the tailgate,
with at least one of the first and second ends of the tailgate cable and the wiring harness being selectively detachable from the vehicle or tailgate so as to permit the tailgate to be selectively detached from the vehicle, the tailgate cable and the wiring harness forming a unitary assembly which attaches and detaches together as a unit with respect to the vehicle and the tailgate.

24. The tailgate assembly of claim 23, wherein
the power assembly provides electrical power from a controller.

25. The tailgate assembly of claim 23, wherein
the power assembly provides power from a motor assembly.

26. The tailgate assembly of claim 23, wherein
the tailgate includes at least one electrical component connected to the electrical connector, the at least one electrical component being selected from a group comprising at least one of a brake light, a reverse light, a pinch strip, and a latch mechanism.

* * * * *